(12) United States Patent
Jozuka et al.

(10) Patent No.: US 9,624,404 B2
(45) Date of Patent: Apr. 18, 2017

(54) STRETCHABLE PRESSURE-SENSITIVE ADHESIVE SHEET

(71) Applicant: NITTO DENKO CORPORATION, Ibaraki-shi, Osaka (JP)

(72) Inventors: Kenta Jozuka, Ibaraki (JP); Naoki Nakayama, Ibaraki (JP); Yoshimasa Nishida, Ibaraki (JP); Yoshikazu Soeda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/806,188

(22) Filed: Jul. 22, 2015

(65) Prior Publication Data

US 2016/0024352 A1    Jan. 28, 2016

(30) Foreign Application Priority Data

Jul. 23, 2014   (JP) ................. 2014-150045

(51) Int. Cl.
| | | |
|---|---|---|
| C09J 7/00 | (2006.01) | |
| C09J 7/02 | (2006.01) | |
| H01M 2/10 | (2006.01) | |

(52) U.S. Cl.
CPC ........... *C09J 7/0217* (2013.01); *C09J 7/0239* (2013.01); *H01M 2/1016* (2013.01); *C09J 2201/128* (2013.01); *C09J 2201/618* (2013.01); *C09J 2203/318* (2013.01)

(58) Field of Classification Search
CPC ..... Y10T 428/28; C09J 7/00; C09J 2201/128; C09J 2201/618

USPC .................................................. 428/80, 343
See application file for complete search history.

(56) References Cited

U.S. PATENT DOCUMENTS

| | | |
|---|---|---|
| 6,544,639 B1 | 4/2003 | Lühmann et al. |
| 6,680,096 B1 | 1/2004 | Lühmann et al. |
| 6,874,740 B1 | 4/2005 | Leiber et al. |
| 2009/0229732 A1 | 9/2009 | Determan et al. |

FOREIGN PATENT DOCUMENTS

| | | |
|---|---|---|
| EP | 0 845 517 A2 | 6/1998 |
| EP | 0 987 309 A2 | 3/2000 |
| EP | 1 077 242 A2 | 2/2001 |
| JP | 6-346032 A | 12/1994 |
| JP | 2005-500133 A | 1/2005 |
| WO | 03/017899 A2 | 3/2003 |
| WO | 2005/026280 A1 | 3/2005 |

OTHER PUBLICATIONS

The Extended European Search Report dated Dec. 16, 2015, issued by the European Patent Office in corresponding European Application No. 15176807.4.

*Primary Examiner* — Alexander Thomas
(74) *Attorney, Agent, or Firm* — Sughrue Mion, PLLC

(57) ABSTRACT

This invention provides a PSA sheet that allows prevention or reduction of damage such as fracture with efficient stretch removability. A stretchable PSA sheet is provided, comprising a PSA layer and a film-like substrate supporting the PSA layer. The PSA sheet has a long section. The long section has a tapered segment that extends, tapering to a first end of the length direction and the film-like substrate has a minimum cross-sectional area larger than 0.30 mm$^2$ in the tapered segment.

10 Claims, 5 Drawing Sheets

STRETCHABLE PRESSURE-SENSITIVE ADHESIVE SHEET

CROSS-REFERENCE

The present application claims priority to Japanese Patent Application No. 2014-150045 filed on Jul. 23, 2014, the entire contents of which are incorporated herein by reference.

BACKGROUND OF THE INVENTION

1. Field of the Invention

The present invention relates to a stretchable pressure-sensitive adhesive sheet.

2. Description of the Related Art

In general, pressure-sensitive adhesive (or PSA; the same applies hereinafter) has characteristics to be in a soft solid (viscoelastic) state in a room temperature range and adhere to adherend under some pressure. For such advantageous characteristics, PSA has been preferably used, for instance, in a form of a substrate-supported PSA sheet having a PSA layer at least on one face of a substrate, for fixing components in mobile electronics such as mobile phones, smartphones, tablet PCs, etc. PSA sheets with film-like substrates have certain mechanical strength and are less susceptible to damage such as fracture, etc. Thus, they are preferably used as PSA sheets that are removed after adhered. Literatures disclosing this type of conventional art include Japanese Patent Application Publication No. H6-346032 and Japanese Patent Application Publication (Translation of PCT International Application) No. 2005-500133. Both Japanese Patent Application Publication Nos. H6-346032 and 2005-500133 disclose conventional inventions comprising stretchable substrates. Japanese Patent Application Publication No. 2005-500133 relates to a medical PSA sheet applied to skin.

SUMMARY OF THE INVENTION

PSA sheets adhered to adherends may be removed therefrom during repair, replacement, inspection, recycling, etc. of the adherends or surrounding components. Some adherends are susceptible to deformation. Accordingly, it is desirable to construct PSA sheets to be removable without causing deformation of or damage to the adherend. Specifically, for instance, in a preferable construction, the PSA sheet is stretchable with a segment exposed to the outside so that pulling by the exposed segment can cause tensile deformation of the PSA sheet. With such a construction, by means of the tensile deformation of the PSA sheet, the PSA sheet can be removed from the adherend surface while preventing deformation of the adherend. However, in some cases, to the PSA sheet stretched by pulling for removal, the pulling is unbearable and results in damage such as fracture before the completion of removal. Removal by pulling (stretch removal) involves stretching (extension) of the PSA sheet. Thus, a certain amount of time is usually required to complete the stretch removal while being careful not to break the PSA sheet being stretched, whereby efficient removal is not always possible.

While the damage to the PSA sheet may depend on the way of peeling, basically, it depends largely on the relationship between the mechanical strength and shear adhesive strength (peel strength in the shear direction) of the PSA sheet. Thus, in removing the PSA sheet, when the adhesive strength is kept further below the mechanical strength lowered by the tensile deformation of the PSA sheet, the damage to the PSA sheet can be reduced during the removal. While maintaining the mechanical strength of the PSA sheet above the adhesive strength, by lowering the mechanical strength along with the progress of separation, the tensile load during the removal may decrease along with the progress of separation, improving the stretch removability of the PSA sheet.

Under the understanding as described above, the present inventors have conducted earnest studies and resulted in finding out a construction that allows efficient removal of the PSA sheet by means of the shape of the PSA sheet, but not by the PSA composition, substrate material, application method or the like, while preventing or reducing damage such as fracture, etc., whereby the present invention has been completed. In other words, an objective of the present invention is to provide a PSA sheet that allows prevention or reduction of damage such as fracture, etc., along with efficient stretch removal.

The present invention provides a stretchable PSA sheet comprising a PSA layer and a film-like substrate supporting the PSA layer. The PSA layer has a long section. The long section has a tapered segment that extends, tapering to a first end of the length direction. In the tapered segment, the film-like substrate has a minimum cross-sectional area larger than $0.30 \text{ mm}^2$.

When a PSA sheet having this construction is adhered on an adherend and pulled in the direction opposite the first end of the long section, the PSA sheet undergoes tensile deformation. The deformation causes the PSA sheet to peel off the adherend. The substrate's minimum cross-sectional area is greater than the prescribed value in the tapered segment. Accordingly, while the mechanical strength (typically the tensile stress) of the PSA sheet is maintained at or above a certain level relatively, yet absolutely, the tensile load gradually decreases along with the tapering. As the separation of the PSA sheet progresses by the pulling, the adhesive strength decreases at the location of separation along with the tapering. As a result, while damage such as fracture, etc., caused by the pulling is prevented or reduced, the PSA sheet can be efficiently stretch-removed (stretch-released) from the adherend.

In a preferable embodiment of the PSA sheet disclosed herein, the tapered segment has a width $W1$ ($mm$) at the first end, a maximum width $W2$ ($mm$) and a length $L$ (mm) from the first end of the length direction of the long section to where the maximum width $W2$ is located, satisfying an equation $(W2-W1)/L < 9.5/80$. By reducing the slope of taper (typically adjusting the angle) as described above, the reduction in tensile load associated with the progress of separation becomes milder during stretch removal. This highly prevents damage during removal of the PSA sheet. In particular, for instance, when the stress in the PSA sheet rapidly decreases during the pulling, because the pulling is continued with at least a certain amount of force, an excessive load equivalent to the decrease in the amount of stress may be momentarily applied to the PSA sheet. This may cause damage such as fracture, etc., to the PSA sheet. The occurrence of such failure can be avoided by the aforementioned construction.

In a preferable embodiment of the art disclosed herein, the PSA sheet in a state of being adhered on an adherend is intended to be pulled in the direction opposite the first end of the length direction for removal from the adherend. By employing such a removal method, the PSA sheet disclosed herein can be efficiently removed from the adherend without causing deformation or damage to the adherend.

In a preferable embodiment of the PSA sheet disclosed herein, a tab is provided to the end opposite the first end of the length direction of the long section. In removing the PSA sheet, the tab is held and pulled to further increase the workability for removal of the PSA sheet.

In a preferable embodiment, the PSA sheet disclosed herein comprises, as the PSA layer, a first PSA layer placed above a first face of the film-like substrate and a second PSA layer placed above a second face of the film-like substrate. Such a substrate-supported, adhesively double-faced PSA sheet can be preferably used as a highly reliable fastening means (typically joining means for two adherends).

The PSA sheet disclosed herein is preferably used in an embodiment where it is used for joining two adherends and is afterwards removed from the two adherends in such a way that it is pulled out from between the two adherends. While in the state of joining the two adherends, by pulling the PSA sheet in the direction opposite the first end of the long section (typically at an angle that acts in the shear direction), the PSA sheet can be pulled and removed out from the two adherends without fracture.

In a preferable embodiment of the PSA sheet disclosed herein, the film-like substrate is an unexpanded resin film substrate. The use of the unexpanded resin film substrate can preferably bring about excellent stretch removability.

The PSA sheet disclosed herein can be efficiently stretch-removed without fracture. For this advantageous feature, it is particularly preferably used as a PSA sheet for fastening batteries which are often removed during parts repair, replacement, inspection, etc. The art disclosed herein provides a PSA sheet preferably used for fastening a battery.

DETAILED DESCRIPTION OF THE INVENTION

Figure 1:
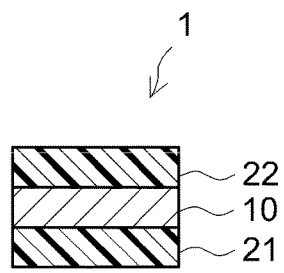
FIG. 1 shows a cross-sectional view schematically illustrating the PSA sheet according to an embodiment.

Preferred embodiments of the present invention are described below. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field. The embodiments described in the drawings are schematized for clear illustration of the present invention, and do not necessarily represent the accurate sizes or reduction scales of the PSA sheet to be provided as an actual product by the present invention.

The term "PSA" in this description refers to, as described earlier, a material that exists as a soft solid (a viscoelastic material) in a room temperature range and has a property to adhere easily to adherend with some pressure applied. As defined in "Adhesion: Fundamental and Practice" by C. A. Dahlquist (McLaren & Sons (1966), P. 143), PSA referred to herein is a material that has a property satisfying complex tensile modulus $E^*(1\text{ Hz})<10^7$ dyne/cm² (typically, a material that exhibits the described characteristics at 25° C.).

The concept of PSA sheet herein encompasses so-called PSA tapes, PSA labels, PSA films and the like.

<Construction of PSA Sheet>

Figure 2:
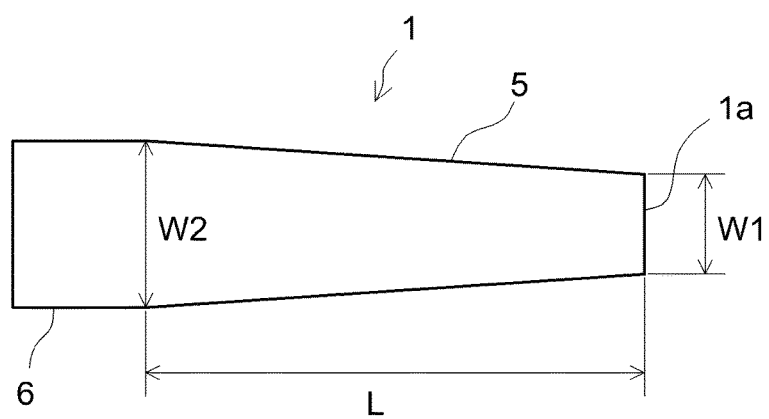
FIG. 2 shows a top view schematically illustrating the PSA sheet in FIG. 1.

FIG. 1 shows a cross-sectional view schematically illustrating the PSA sheet according to an embodiment. FIG. 2 is a top view schematically illustrating the PSA sheet in FIG. 1.

As shown in FIG. 1, a PSA sheet 1 comprises PSA layers 21 and 22 placed on the respective faces (both non-releasable) of a film-like substrate 10. Before used, PSA sheet 1 has a construction such that the respective surfaces (respective adhesive faces) of PSA layers 21 and 22 are protected with release liners (not shown in the drawing).

As shown in FIG. 2, PSA sheet 1 is formed into a long piece, having a tapered segment 5 which extends, tapering toward a first end 1a of the length direction. Because of this, when PSA sheet 1 is being stretch-removed, as the separation progresses, the tensile load gradually decreases while the adhesive strength decreases at the location of separation, thereby providing excellent stretch-removability. Specifically, tapered segment 5 is formed so as to linearly taper off from the location of the maximum width W2 to have a certain width W1 at the tip (first end) 1a. In other words, the tapered segment 5 has a trapezoidal shape. The width W1 is also the minimum width in the tapered segment 5.

With respect to the length direction of PSA sheet 1, the other end opposite the first end 1a is formed with no tapering. In other words, the tapered segment 5 is formed only on one side of the length direction of PSA sheet 1. At the end opposite the first end 1a, a planar rectangular tab 6 is provided. The use of this tab 6 for removal increases the workability for removal of the PSA sheet. The method for forming tab 6 is not particularly limited. For instance, it may be formed by providing film-like substrate 10 with a segment free of PSA layers 21 and 22 thereby to expose this segment. Alternatively, it may be formed by attaching a tab made of paper or resin to the adhesive faces of PSA sheet 1.

Preferably, the tapered segment 5 has a width W1 (mm) at the first end 1a, a maximum width W2 (mm) and a distance L (mm) (typically the shortest distance) from the first end 1a of the length direction of PSA sheet 1 to the location of the maximum width W2, satisfying the equation $(W2-W1)/L<9.5/80$. By reducing the slope of taper in such a way, the damage during stretch removal can be highly prevented. In the equation, $(W2-W1)/L$ is more preferably 9.0/80 or less (e.g. 8.0/80 or less, typically 7.0/80 or less). When the slope of taper is excessively low, the load reduction effect may become less likely obtainable during stretch removal. Thus, $(W2-W1)/L$ in the equation is preferably 1.0/80 or greater (e.g. 3.0/80 or greater, typically 5.0/80 or greater).

From the standpoint of preventing damage during stretch removal, the ratio (W1/W2) of width W1 (mm) at the first end 1a to maximum width W2 (mm) of the tapered segment 5 is preferably about 0.25 or higher (e.g. 0.3 or higher, typically 0.4 or higher). From the standpoint of obtaining the load reduction effect during stretch removal, (W1/W2) is preferably about 0.9 or lower (e.g. 0.8 or lower, typically 0.6 or lower).

The width W1, width W2 or distance L is not particularly limited. From the standpoint of the application site of PSA sheet 1 and damage prevention, etc., the width W1 can be about 1 mm to 20 mm (e.g. 2 mm to 12 mm, typically larger than 3 mm, but 8 mm or smaller). For the same reasons as the width W1, the width W2 may be about 1 mm to 30 mm (e.g. 3 mm to 20 mm, typically 5 mm to 15 mm). From the standpoint of the workability for stretch removal, etc., the width W2 is preferably 10 mm or larger (e.g. 12 mm or larger). The width W2 is also the width of where the tapering begins. When PSA sheet 1 has tab 6, the width W2 may also be the width (typically the base width) of tab 6. When the PSA sheet 1 is a long piece as in the present embodiment, the width W2 may also be the width of PSA sheet 1. Each of width W1 and width W2 is a length that orthogonally intersects the length direction of the PSA sheet or its long section. From the standpoint of the workability for stretch removal, etc., the distance L is preferably 10 mm to 300 mm (e.g. 30 mm to 150 mm, typically 50 mm to 100 mm). As in this embodiment, when PSA sheet 1 is a long piece, L may also be the length of PSA sheet 1.

When the tapered segment 5 linearly tapers off, the angle θ formed with two sides of the tapered segment 5 is preferably 1° or larger. By this, the load reduction effect is likely obtained during stretch removal. The angle θ is more preferably 2° or larger (e.g. 3° or larger, typically 4° or larger). From the standpoint of preventing damage during stretch removal, the angle θ is preferably 20° or smaller (e.g. 12° or smaller, typically 6° or smaller). The angle θ is specifically the contained angle formed with the lines extrapolated from the two sides forming the taper.

PSA sheet 1 is characterized by the film-like substrate 10 having a minimum cross-sectional area larger than 0.30 mm$^2$ in the tapered segment 5. This ensures at least a certain level of mechanical strength in the PSA sheet, thereby preventing or reducing damage such as fracture, etc., during stretch removal. The minimum cross-sectional area is more preferably 0.40 mm$^2$ or larger (e.g. 0.50 mm$^2$ or larger, 0.60 mm$^2$ or larger). The upper limit of minimum cross-sectional area is not particularly limited. For instance, it is suitably about 2.0 mm$^2$ or smaller (typically 1.6 mm$^2$ or smaller). The minimum cross-sectional area of film-like substrate 10 is usually equal to the edge surface area of substrate 10 at the tip of the tapered segment 5. In this case, the minimum cross-sectional area can be determined by multiplying the thickness of film-like substrate 10 by the minimum width of tapered segment 5 (tip width of tapered segment 5).

The total thickness of the PSA sheet (including PSA layers 21, 22 and film-like substrate 10, but excluding the release liners) 1 disclosed herein is not particularly limited. It is suitably in a range of about 30 μm to 500 μm. In view of the adhesive properties, etc., the total thickness is preferably about 40 μm to 300 μm (e.g. 50 μm to 200 μm). The total width at or below the prescribed value may serve advantageously to reduce the thickness, volume and weight of the product and save raw materials, etc.

The PSA sheet disclosed herein is not limited to a double-faced PSA sheet and can be a substrate-supported single-faced PSA sheet having a PSA layer on one face of a film-like substrate (support).

The PSA sheet may not be a long piece as far as the PSA sheet has a long part (a long section). With the long section having a tapered segment, the stretch removability of the PSA sheet increases. The PSA sheet may have two or more long sections. In such a case, the two or more long sections may be partially connected via tab(s), etc. With respect to the two or more long sections, for instance, their length directions may be in parallel with each other.

The taper may not be linear and can be curved (e.g. arched). The tab's shape is not particularly limited. It is possible to use various kinds of shapes that can be held by fingers. It may not include a tab.

<Properties of PSA Sheet>

The PSA sheet disclosed herein is characterized by being stretchable. In this description, the term "stretchable PSA sheet" is defined as a PSA sheet having an elongation at break of 20% or greater. This may cause the PSA sheet to undergo tensile deformation during stretch removal. The elongation at break of the PSA sheet may be 50% or greater (e.g. 100% or greater, typically 200% or greater). In a preferable embodiment, the PSA sheet exhibits an elongation at break of 300% or greater. By this, the pulling force interacts with the tensile deformation of the PSA sheet, bringing about greater stretch removability. In particular, the PSA sheet shows excellent removability (shear removability) when pulled at an angle (typically at an angle of −90° to 90°, e.g. 0° or larger, but smaller than 90°) that acts in the shear direction relative to the adhesion face. A PSA sheet showing this property is preferable also in terms of preventing adherend deformation during removal. The elongation at break is more preferably 500% or greater (e.g. 700% or greater, typically 800% or greater). The upper limit of elongation at break is not particularly limited. From the standpoint of the workability for removal, etc., it can be, for instance, about 1000% or less (typically 900% or less).

The elongation at break is measured based on the measurement method for "Elongation" described in JIS K 7311: 1995. More specifically, using a test piece in Dumbbell No. 3 shape (width 5 mm, gage length 20 mm), the elongation at break can be measured at a tensile speed of 300 mm/min. As the tensile tester, can be used product name "Autograph AG-10 G Tensile Tester" available from Shimadzu Corporation. For the test, some powder is preferably applied to the adhesive face to eliminate the influence of the PSA's tack. While the tensile direction in the test is not particularly limited, it is preferably in the same direction as the length direction of the PSA sheet or its long section.

The PSA sheet disclosed herein preferably exhibits a tensile strength at break of 10 MPa or greater. This leads to a construction less susceptible to the occurrence of damage such as fracture, etc., during removal of the PSA sheet. It also tends to bring about excellent workability (e.g. for punching). The tensile strength at break is more preferably 30 MPa or greater (e.g. 45 MPa or greater, typically 60 MPa or greater). Too high a tensile strength at break tends to lower the elasticity and stretchability of the PSA sheet. From such a standpoint, the tensile strength at break is preferably about 100 MPa or less (e.g. 80 MPa or less, typically 70 MPa or less).

The tensile strength at break is measured based on the measurement method for "Tensile Strength" described in JIS K 7311:1995. More specifically, the tensile strength at break can be measured, using a test piece in Dumbbell No. 3 shape (5 mm wide), at a tensile rate of 300 mm/min. The tensile tester and other conditions are basically the same as for the elongation at break described earlier. While the tensile direction in the test is not particularly limited, it is preferably in the same direction as the length direction of the PSA sheet or its long section.

The PSA sheet disclosed herein suitably exhibits a tensile recovery greater than 50%. The tensile recovery is preferably 70% or higher. The tensile recovery is more preferably 80% or higher (e.g. 90% or higher, typically 93% to 100%). This may bring about greater prevention of damage such as fracture, etc., during PSA sheet removal. An explanation for this is as follows. For instance, removal of a PSA sheet by pulling in the shear direction usually requires a certain amount of time depending on the adhesion area, etc. Thus, the removal working can be interrupted midway. In such a case, if the tensile recovery of the PSA sheet is at or below a certain value, the pulling up to the work interruption lowers the mechanical properties (strength, elasticity, etc.) and the removal work may be resumed from this state. In such a case, the PSA sheet may not be able to resist the pulling when the removal work is resumed, likely suffering damage such as fracture, etc. With respect to a PSA sheet exhibiting the aforementioned tensile recovery, even in a case where it is removed in an embodiment including an interruption as described above, the recovery after the pulling reduces the lowering of the mechanical properties, possibly leading to greater prevention of damage.

The tensile recovery is measured by the following method.

[Measurement of Tensile Recovery]

A PSA sheet is subjected to a tensile test in which a designated segment of a length $L_0$ in the PSA sheet is stretched by 100%. After stretched by 100%, the PSA sheet is released. When the designated segment has a length $L_1$ at five minutes after released, the tensile recovery is determined by an equation: tensile recovery (%)=$L_0/L_1 \times 100$.

More specifically, based on JIS K 7311:1995, a test piece of Dumbbell No. 3 shape (width 5 mm, gage length 20 mm) is stretched by 100% at a tensile rate of 300 mm/min. In other words, the test piece is stretched until the gage length is extended by 20 mm. At five minutes after released from the stretched state, the length $L_1$ (gage length in mm) is measured and the tensile recovery is determined by the equation: tensile recovery (%)=$L_0/L_1 \times 100$. In this method, $L_0$ is the initial gage length of 20 mm. The tensile tester and other conditions are basically the same as for the elongation at break described above. While the tensile direction in this test is not particularly limited, it is preferably in the same direction as the length direction of the PSA sheet or its long section.

The PSA sheet disclosed herein preferably exhibits a shear adhesive strength of 0.5 MPa or greater. By this, the PSA sheet is bonded well to an adherend. A PSA sheet exhibiting such adhesive strength may show great stress to a force to cause sliding at the adhesive interface (i.e. a shear force) and thus may serve as a highly reliable adhesion means in an application exposed to such shear force. The shear adhesive strength is more preferably 0.8 MPa or greater (e.g. 1.0 MPa or greater, typically 1.2 MPa or greater). The upper limit of shear adhesive strength is not particularly limited. However, when the shear adhesive strength is excessively high, the stretch removability and adhesive transfer resistance tend to decrease, it is preferably 5 MPa or less (e.g. 3 MPa or less, typically 1.5 MPa or less).

Figure 3:
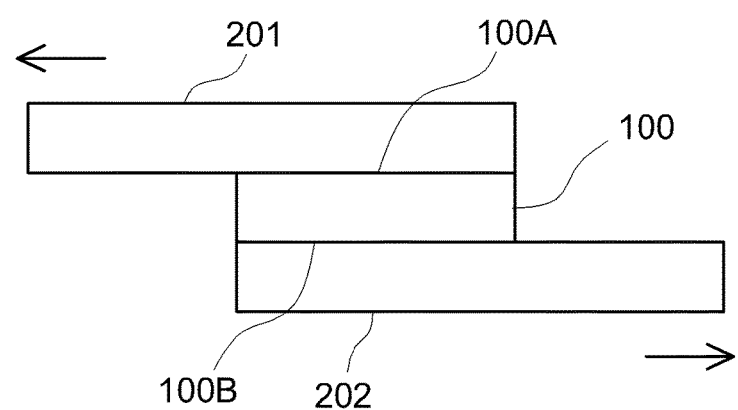
FIG. 3 shows an explanatory drawing schematically illustrating the measurement method for shear adhesive strength.

The shear adhesive strength can be measured by the method described next. A PSA sheet (typically a double-faced PSA sheet) is cut to 20 mm by 20 mm in size to fabricate a measurement sample. In an environment at 23° C. and 50% RH, the respective adhesive faces of the measurement sample are overlaid on and press-bonded to surfaces of two stainless steel plates with a 2 kg roller moved back and forth once. The resultant is left standing for 30 minutes in the same environment. Subsequently, using a tensile tester, shear adhesive strength (MPa) is measured at a tensile rate of 300 mm/min at a peel angle of 0°. Specifically, as shown in FIG. 3, the first and second adhesive face 100A and 100B of measurement sample 100 are overlaid on and press-bonded to stainless steel plates 201 and 202, respectively. This is pulled at the aforementioned rate in the arrow direction (i.e. shear direction) in FIG. 3 and measured for peel strength per 20 mm by 20 mm. From the resulting value, the shear adhesive strength (MPa) is determined. As for an adhesively single-faced PSA sheet (single-faced PSA sheet), the non-adhesive face of the sheet is fastened via an adhesive, etc., to a stainless steel plate and a measurement can be made otherwise in the same way as the above. As the tensile tester, can be used a universal tensile/compression tester (product name "TG-1 kN" available from Minebea Co., Ltd.).

In a preferable embodiment, the PSA sheet has a tensile strength (MPa) at break at least five times (e.g. at least 10 times, typically at least 30 times) the shear adhesive strength (MPa). This may more assuredly prevent damage such as fracture during stretch removal of the PSA sheet.

<Film-Like Substrate>

The film-like substrate disclosed herein preferably exhibits an elongation at break of 300% or greater. A substrate exhibiting such an elongation at break extends in relation to the pulling during PSA sheet removal. The extension caused the PSA sheet to deform and peel off the adherend. As described above, the pulling force interacts with the tensile deformation of the substrate to further increase the stretch removability (especially the shear removability) of the PSA sheet. The elongation at break is more preferably 500% or greater (e.g. 700% or greater, typically 800% or greater). The upper limit of elongation at break is not particularly limited. From the standpoint of the workability for removal, it can be, for instance, about 1000% or less (typically 900% or less). The elongation at break is measured by the same method as for the PSA sheet.

The film-like substrate disclosed herein preferably exhibits a tensile strength at break of 10 MPa or greater. The use of a film-like substrate showing such tensile strength at break makes the PSA sheet less susceptible to fracture and may provide excellent stretch removability (especially shear removability). With the film-like substrate showing such tensile strength at break, the workability (e.g. for punching) tends to also increase. The tensile strength at break is more preferably 30 MPa or greater (e.g. 45 MPa or greater, typically 60 MPa or greater). When the tensile strength at break is excessively high, the elasticity and stretchability of the film-like substrate tend to decrease. From such a viewpoint, the tensile strength at break is preferably about 100 MPa or less (e.g. 90 MPa or less, typically 80 MPa or less). The tensile strength at break is measured by the same method as for the PSA sheet.

The film-like substrate disclosed herein suitably exhibits a tensile recovery greater than 50%. The tensile recovery is preferably 70% or greater. The tensile recovery is more preferably 80% or greater (e.g. 90% or greater, typically 93% to 100%). This may bring about greater prevention of damage such as fracture, etc., during PSA sheet removal. The tensile recovery is measured by the same method as the measurement method for the tensile recovery of the PSA sheet.

As the film-like substrate (support substrate) supporting (backing) the PSA layer, various types of film-like substrates can be used. As the substrate, for instance, a woven fabric film, non-woven fabric film, and resin film can be used. In particular, a resin film is preferable. The resin film can be an unexpanded resin film, rubber-like film, foam film, etc. In particular, the unexpanded resin film and rubber-like film are preferable, with the unexpanded resin film being more preferable. The unexpanded resin film is essentially free of bubbles (voids) that may serve disadvantageously in terms of mechanical strength and tends to have superior mechanical strength such as tensile strength, etc., as compared with a foam body. The unexpanded resin film is also superior in terms of workability (e.g. for punching), size stability, thickness precision, cost efficiency (costs), etc.

The "resin film" in this description refers to an essentially non-porous film and is conceptually distinctive from so-called non-woven fabric and woven fabric (i.e. the concept excludes non-woven fabric and woven fabric). In addition, the unexpanded resin film refers to a resin film that has not been intentionally subjected to a foaming process. Specifically, the unexpanded resin film may have an expansion rate below 1.1-fold (e.g. below 1.05-fold, typically below 1.01-fold).

Preferable examples of the resin material constituting the resin film disclosed herein include polyurethanes such as ether-based polyurethane, ester-based polyurethane, carbonate-based polyurethane, etc.; polyolefins such as polyethylene, polypropylene, ethylene-propylene copolymer, ethylene-butene copolymer, etc.; polyesters such as polyethylene terephthalate, polybutylene terephthalate, polyethylene naphthalate, polybutylene naphthalate, etc.; polycarbonates; and the like. The resin material can be a styrene-based copolymer (typically styrene-based elastomer) such as a styrene-butadiene copolymer, styrene-isoprene copolymer, styrene-ethylene-butylene copolymer, styrene-ethylene-propylene copolymer, styrene-butadiene-styrene copolymer, styrene-isoprene-styrene copolymer, etc.; or can be an acrylic copolymer called acrylic rubber. The resin materials can be used singly as one species or in a combination of two or more species. The resin material encompasses species generally called rubber.

In a preferable embodiment, the film-like substrate is a polyurethane-based resin film. Herein, the polyurethane-based resin film refers to a resin film comprising a polyurethane as the primary component (a component at the highest proportion, typically a component accounting for greater than 50% by weight) among resin components. The polyurethane-based resin film is typically formed of a material that does not substantially show a yield point and is a film material that is likely to form a PSA sheet with certain tensile strength at break, elongation and tensile recovery. The polyurethane-based resin film can also realize great physical properties without addition of additive(s) such as plasticizer, etc. Thus, it can be a preferable substrate in the art disclosed herein in view of preventing bleed-out of the additive(s) s well.

The proportion of polyurethane among the resin components in the polyurethane-based resin film is preferably 70% by weight or higher (e.g. 80% by weight or higher, typically 90% by weight or higher, but 100% by weight or lower). The polyurethane-based resin film disclosed herein may be a film formed of a polymer blend of a polyurethane and other resin. The other resin can be, for instance, one, two or more species among an acrylic resin, polyolefin, polyester, polycarbonate and the like. Alternatively, the art disclosed herein can be implemented also in an embodiment using a substrate essentially free of other resin components besides polyurethane.

The polyurethane is a polymer synthesized by the polyaddition reaction of a polyol (e.g. a diol) and a polyisocyanate (e.g. diisocyanate) at a prescribed ratio. The NCO/OH ratio of the polyurethane can be suitably set to bring about desirable mechanical properties (e.g. tensile strength at break, elongation at break, tensile recovery) based on technical common knowledge to a skilled person in the art.

Examples of a polyol that can be used in synthesizing the polyurethane include diols such as ethylene glycol, propylene glycol, 1,3-propanediol, 1,4-butanediol, 1,5-pentanediol, neopentyl glycol, 1,6-hexanediol, 1,8-octanediol, polyoxytetramethylene glycol, diethylene glycol, polyethylene glycol, polypropylene glycol, etc.; polyester polyols which are polycondensates of the diols and dicarboxylic acids (e.g. adipic acid, azelaic acid, sebacic acid); carbonatediols such as polyalkylene carbonate diols, etc.; and the like. These can be used singly as one species or in a combination of two or more species.

The polyisocyanate that can be used in synthesizing the polyurethane includes an aromatic, aliphatic and alicyclic diisocyanate as well as their polymers (e.g. dimers, trimers), etc. Examples of the diisocyanate include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatemethyl)cyclohexane, methylcyclohexane diisocyanate, m-tetramethylxylylene diisocyanate, and the like. These can be used singly as one species or in a combination of two or more species. Among them, an aromatic diisocyanate is preferable.

The polyurethane may include other copolymerized component(s) in addition to the polyol and polyisocyanate. As the other copolymerized component(s), one, two or more species can be used among a monocarboxylic acid, dicarboxylic acid, trifunctional or higher polycarboxylic acid, hydroxycarboxylic acid, alkoxycarboxylic acid, their derivatives and the like. The proportion of these other copolymerized component(s) is suitably less than about 30% by weight (e.g. less than 10% by weight, typically less than 5% by weight) of the polyurethane. The art disclosed herein can be preferably implemented in an embodiment comprising a polyurethane-based resin film substrate comprising, as the primary component, a polyurethane free of other copolymerized components.

The film-like substrate (e.g. a resin film substrate) may contain, as necessary, various additives such as fillers (inorganic fillers, organic fillers, etc.), colorant (pigment, dye), anti-aging agent, antioxidant, UV (ultraviolet ray) absorber, anti-static agent, slipping agent, plasticizer, and so on. The proportion of various additives added is usually less than about 30% by weight (e.g. less than 20% by weight, typically less than 10% by weight).

The surfaces of the film-like substrate may be subjected to a heretofore known surface treatment such as corona discharge treatment, plasma treatment, UV irradiation, acid treatment, alkali treatment, primer coating, etc. These surface treatments may increase the adhesion between the film-like substrate and PSA layer, that is, the anchoring of the PSA layer to the substrate. When the film-like substrate is a polyurethane-based resin film, because of its high surface energy, good anchoring can be attained without a given surface treatment as described above.

The film-like substrate may have a single-layer structure, or a two-layer, three-layer, or higher multi-layer structure. In a multi-layer structure, at least one layer (preferably each layer) preferably has a continuous structure of the resin (more preferably polyurethane). As for the method for producing the film-like substrate, a heretofore known method can be suitably employed without particular limitations. When using a resin film substrate as the film-like substrate, can be suitably employed a general film-forming method such as extrusion, inflation molding, T-die cast molding, calendar roll molding, etc.

The thickness of the film-like substrate is not particularly limited and can be suitably selected in accordance with the purpose. It is usually suitably about 20 μm or larger (e.g. 30 μm or larger, typically 50 μm or larger), or preferably 60 μm or larger (e.g. 70 μm or larger, typically 80 μm or larger). A film-like substrate having such a thickness may be less susceptible to fracture and provide excellent stretch removability. The thickness of the film-like substrate is preferably 300 μm or smaller, or more preferably 200 μm or smaller (e.g. 150 μm or smaller, typically 120 μm or smaller). According to the art disclosed herein, even in a construction using a substrate having a thickness equal to or smaller than the prescribed value, good stretch removability can be obtained. Making the film-like substrate thinner is also advantages in reducing the thickness, volume and weight of the PSA sheet, saving raw materials, etc.

<PSA Layer>

The PSA layer disclosed herein may comprise, as its base polymer(s), one, two or more species among various types of rubber-like polymers such as acrylic polymers, rubber-based polymers, polyester-based polymers, urethane-based polymers, polyether-based polymers, silicone-based polymers, polyamide-based polymers, fluorinated polymers, and the like.

In a preferable embodiment, from the standpoint of the adhesive properties (typically shear adhesive strength), molecular design, stability over time, etc., the PSA layer is an acrylic PSA layer comprising an acrylic polymer as the base polymer. The "base polymer" of a PSA refers to the primary component (typically a component accounting for greater than 50% by weight) among the polymer components in the PSA.

As the acrylic polymer, for instance, a preferable polymer is formed of starting monomer(s) comprising an alkyl (meth) acrylate as the primary monomer and possibly a secondary monomer copolymerizable with the primary monomer. The primary monomer herein refers to a component that accounts for more than 50% by weight of all the monomers in the starting monomer(s).

As the alkyl (meth)acrylate, for instance, can be preferably used a compound represented by the following formula (1):

$$CH_2=C(R^1)COOR^2 \quad (1)$$

Herein, $R^1$ in the formula (1) is a hydrogen atom or a methyl group. $R^2$ is an acrylic alkyl group having 1 to 20 carbon atoms (such a range of the number of carbon atoms may be indicated as "$C_{1-20}$" hereinafter). From the standpoint of the storage elastic modulus of the PSA, etc., an alkyl (meth)acrylate with $R^2$ being a $C_{1-14}$ (e.g. $C_{2-10}$, typically $C_{4-8}$) linear alkyl group is preferable, and an alkyl (meth) acrylate with $R^1$ being a hydrogen atom and $R^2$ being a $C_{4-8}$ linear alkyl group is more preferable. As the alkyl (meth) acrylate with $R^2$ being a $C_{1-20}$ linear alkyl group, solely one species or a combination of two or more species can be used. Preferable alkyl (meth)acrylates include n-butyl acrylate (BA) and 2-ethylhexyl acrylate (2EHA). From the standpoint of the adhesive properties and adhesive transfer resistance, etc., BA is more preferable.

The primary monomer content in all the monomers is preferably 70% by weight or greater (e.g. 85% by weight or greater, typically 90% by weight or greater). The upper limit of primary monomer content is not particularly limited. Preferably, it is 99.5% by weight or less (e.g. 99% by weight or less).

The secondary monomer copolymerizable with the alkyl (meth)acrylate being the primary monomer may be useful for introducing crosslinking points in the acrylic polymer or increasing the cohesive strength of the acrylic polymer. As the secondary monomer, one, two or more species of functional group-containing monomers can be used, for instance, a carboxyl group-containing monomer, hydroxyl group-containing monomer, acid anhydride group-containing monomer, amide group-containing monomer, amino group-containing monomer, keto group-containing monomer, monomer having a nitrogen atom-containing ring, alkoxysilyl group-containing monomer, imide group-containing monomer, epoxy group-containing monomer, etc. For instance, from the standpoint of increasing the cohesive strength, a preferable acrylic polymer is one in which a carboxyl group-containing monomer and/or hydroxyl group-containing monomer are copolymerized as the secondary monomer. Preferable examples of the carboxyl group-containing monomer include acrylic acid (AA), methacrylic acid (MAA) and the like. Examples of the hydroxyl group-containing monomer include hydroxyalkyl (meth) acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, etc., as well as unsaturated alcohols and the like. Among them, hydroxyalkyl (meth)acrylates are preferable, with 2-hydroxyethyl acrylate (HEA) and 4-hydroxybutyl acrylate (4HBA) being more preferable.

The amount of the secondary monomer can be suitably selected to produce desirable cohesive strength without particular limitations. Usually, from the standpoint of combining well-balanced adhesive strength and cohesive strength, the amount of secondary monomer is suitably 0.5% by weight or more, or preferably 1% by weight or more of all the monomers in the acrylic polymer. The amount of the secondary monomer is suitably 30% by weight or less, or preferably 10% by weight or less (e.g. 5% by weight or less) of all the monomers. When a hydroxyl group-containing monomer is copolymerized in the acrylic polymer, the hydroxyl group-containing monomer content is preferably in a range of about 0.001 to 10% by weight (e.g. 0.01 to 5% by weight, typically 0.05 to 2% by weight) of all the monomers used for synthesis of the acrylic polymer. This may bring about a PSA having a higher level of well-balanced adhesive strength and cohesive strength.

In the acrylic polymer disclosed herein, a monomer (other monomer) besides those described above may be copolymerized to an extent not significantly impairing the effects of the present invention. For instance, the other monomer can be used for adjusting the glass transition temperature of the acrylic polymer, adjusting the adhesive properties (e.g. removability), etc. Examples of a monomer capable of increasing the cohesive strength of PSA include a sulfonate group-containing monomer, phosphate group-containing monomer, cyano group-containing monomer, vinyl ester, aromatic vinyl compound, etc. As the other monomer, solely one species or a combination of two or more species can be used. Among them, the vinyl ester is a preferable example. Specific examples of the vinyl ester include vinyl acetate (VAc), vinyl propionate, vinyl laurate, etc. In particular, VAc is preferable. The other monomer content is preferably about 30% by weight or less (typically 0.01 to 30% by weight, e.g. 0.1 to 10% by weight) of all the monomers used for synthesis of the acrylic polymer.

The copolymer composition of the acrylic polymer is designed such that the polymer has a glass transition temperature (Tg) of suitably −15° C. or below (typically −70° C. or above, but −15° C. or below), preferably −25° C. or below (typically −60° C. or above, but −25° C. or below), or more preferably −40° C. or below (e.g. −60° C. or above, but −40° C. or below). From the standpoint of the impact resistance of the PSA sheet, etc., it is preferable that the acrylic polymer has a Tg value at or below the upper limit.

The Tg of the acrylic polymer can be adjusted by suitably changing the monomer composition (i.e. types and relative amounts of monomers used for the synthesis of the polymer). Herein, the Tg of the acrylic polymer refers to a value determined by the Fox equation based on the Tg values of homopolymers of the respective monomers constituting the polymer and weight fractions (copolymer ratio by weight) of the monomers. As the Tg values of the homopolymers, values given in a known document are used.

As the Tg values of the homopolymers, the following values are used with respect to the monomers shown next:
  2-ethylhexyl acrylate −70° C.
  butyl acrylate −55° C.
  vinyl acetate 32° C.
  acrylic acid 106° C.
  methacrylic acid 228° C.
  2-hydroxyethyl acrylate −15° C.

With respect to monomers other than those listed above, for the Tg values of the corresponding homopolymers, values given in "Polymer Handbook" (3rd edition, John Wiley & Sons, Inc., Year 1989) are used. When no values are given in the reference book, values obtained by the following measurement method are used (see Japanese Patent Application Publication No. 2007-51271).

The method for obtaining the acrylic polymer is not particularly limited. Various polymerization methods known as synthetic means for acrylic polymers can be suitably employed, with the methods including a solution polymerization method, emulsion polymerization method, bulk polymerization method, suspension polymerization method, etc. For instance, a solution polymerization method can be preferably used. As a method for supplying monomers when carrying out solution polymerization, can be suitably employed an all-at-once supply method to supply all starting monomers at once, continuous (dropwise) supply method, portionwise (dropwise) supply method, etc. The polymerization temperature can be suitably selected depending on the types of monomers and solvent being used, type of polymerization initiator, etc. For example, it can be about 20° C. to 170° C. (typically 40° C. to 140° C.).

The solvent (polymerization solvent) used for solution polymerization can be suitably selected among heretofore known organic solvents. For instance, aromatic compounds (typically aromatic hydrocarbons) such as toluene, etc., as well as aliphatic or alicyclic hydrocarbons such as ethyl acetate, etc., are preferably used.

The initiator used for the polymerization can be suitably selected from heretofore known polymerization initiators in accordance with the type of polymerization method. For instance, one, two or more species of azo-based polymerization initiator, such as 2,2'-azobisisobutylonitrile (AIBN), etc., can be preferably used. Other examples of the polymerization initiator include persulfate salts such as potassium persulfate, etc.; peroxide-based initiators such as benzoyl peroxide, hydrogen peroxide, etc.; substituted ethane-based initiators such as phenyl-substituted ethane, etc.; aromatic carbonyl compounds; and so on. Yet other examples of the polymerization initiator include a redox-based initiator by a combination of a peroxide and a reducing agent. These polymerization initiators can be used singly as one species or in a combination of two or more species. The polymerization initiator can be used in a typical amount, selected from a range of, for instance, about 0.005 to 1 part by weight (typically 0.01 to 1 part by weight) relative to 100 parts by weight of the total monomer content.

The weight average molecular weight (Mw) of the base polymer (preferably an acrylic polymer) disclosed herein is not particularly limited. It can be in a range of, for instance, $10 \times 10^4$ or larger, but $500 \times 10^4$ or smaller. From the standpoint of combining cohesive strength and adhesive strength balanced at a high level, the base polymer (preferably an acrylic polymer) preferably has a Mw of $10 \times 10^4$ to $150 \times 10^4$ (e.g. $20 \times 10^4$ to $75 \times 10^4$, typically $35 \times 10^4$ to $65 \times 10^4$). The Mw herein refers to the value based on standard polystyrene determined by gel permeation chromatography (GPC). As the GPC system, for instance, model name "HLC-8320 GPC" (column: TSKgel GMH-H(S) available from Tosoh Corporation) can be used. The same applies to the working examples described later.

The PSA layer disclosed herein may be formed from an aqueous PSA composition, solvent-based PSA composition, hot-melt PSA composition, or active energy ray-curable PSA composition. The aqueous PSA composition refers to a PSA composition comprising a PSA (PSA layer-forming components) in a solvent primarily comprising water (an aqueous solvent) and typically includes what is called a water-dispersed PSA composition (a composition in which the PSA is at least partially dispersed in water). The solvent-based PSA composition refers to a PSA composition comprising a PSA in an organic solvent. From the standpoint of preferably obtaining adhesive properties such as shear adhesive strength, etc., the art disclosed herein is preferably implemented in an embodiment comprising a PSA layer formed from a solvent-based PSA composition.

The PSA layer disclosed herein may have a composition comprising a tackifier. The tackifier is not particularly limited. Various tackifier resins can be used, for instance, a rosin-based tackifier resin, terpene-based tackifier resin, hydrocarbon-based tackifier resin, epoxy-based tackifier resin, polyamide-based tackifier resin, elastomer-based tackifier resin, phenol-based tackifier resin, ketone-based tackifier resin, etc. These tackifier resins can be used singly as one species or in a combination of two or more species.

Specific examples of the rosin-based tackifier resin include unmodified rosins (raw rosins) such as gum rosin, wood rosin, tall-oil rosin, etc.; modified rosins (hydrogenated rosins, disproportionated rosins, polymerized rosins, other chemically-modified rosins, etc., and the same applies hereinafter) obtainable from these unmodified rosins via modifications such as hydrogenation, disproportionation, polymerization, etc.; various other rosin derivatives; and the like. Examples of the rosin derivatives include rosin esters such as unmodified rosins esterified with alcohols (i.e., esterification products of unmodified rosins), modified rosins esterified with alcohols (i.e., esterification products of modified rosins), and the like; unsaturated fatty acid-modified rosins such as unmodified rosins and modified rosins modified with unsaturated fatty acids; unsaturated fatty acid-modified rosin esters such as rosin esters modified with unsaturated fatty acids; rosin alcohols from the reductive treatment of a carboxyl group in unmodified rosins, modified rosins, unsaturated fatty acid-modified rosins or unsaturated fatty acid-modified rosin esters; metal salts of rosins (in particular, of rosin esters) such as unmodified rosins, modified rosins, various rosin derivatives, etc.; rosin phenol resins obtainable from the addition of phenol to rosins (unmodified rosin, modified rosin, various rosin derivatives, etc.) by heat polymerization in the presence of an acid catalyst; and so on. When an acrylic polymer is used as the base polymer, it is preferable to use a rosin-based tackifier resin. From the standpoint of increasing the adhesive properties such as adhesive strength, etc., it is more preferable to select a single species or to use a combination of two, three or more species of varied types and properties (e.g. softening point), etc., among the rosin-based tackifier resins.

Examples of the terpene-based tackifier resin include terpene resins such as an α-pinene polymer, β-pinene polymer, dipentene polymer, etc.; modified terpene resins from the modification (e.g., phenol modification, aromatic group modification, hydrogenation, hydrocarbon modification, etc.) of these terpene resins; and the like. Examples of the modified terpene resins include a terpene-modified phenol resin, styrene-modified terpene resin, aromatic group-modified terpene resin, hydrogenated terpene resin, and the like. When an acrylic polymer is used as the base polymer, the use of a terpene-based tackifier resin (e.g. terpene-modified phenol resin) is preferable. In particular, from the standpoint of increasing the adhesive properties such as adhesive strength, etc., it is preferable to use one species or a combination of two or more species of varied types and properties (e.g. softening point), etc., among the terpene-based tackifier resins (e.g. terpene-modified phenol resins).

Examples of the hydrocarbon-based tackifier resin include various hydrocarbon-based resins such as aliphatic hydrocarbon resins, aromatic hydrocarbon resins, alicyclic hydrocarbon resins, aliphatic-aromatic petroleum resins (styrene-olefin-based copolymers, etc.), aliphatic-alicyclic petroleum resins, hydrogenated hydrocarbon resins, coumarone-based resins, coumarone-indene-based resins, and the like.

In the art disclosed herein, a preferable resin has a softening point (softening temperature) of about 70° C. or higher (preferably about 100° C. or higher, more preferably about 110° C. or higher). With a PSA comprising a tackifier resin having a softening point at or above this lower limit, a PSA sheet can be obtained with greater adhesive strength. Among the tackifier resins exemplified above, it is preferable to use a terpene-based tackifier resin (e.g. terpene-modified phenol resin), rosin-based tackifier resin (e.g. esterification product of polymerized rosin), etc., having such a softening point. The upper limit of softening point of the tackifier resin is not particularly limited. For instance, it can be about 200° C. or lower (typically about 180° C. or lower). The softening point of a tackifier resin referred to herein is defined as the value measured by the softening point test method (ring and ball method) specified in either JIS K 5902 or JIS K 2207.

The amount of tackifier resin used is not particularly limited, and can be selected in accordance with the target adhesive properties (adhesive strength, etc.). For example, based on non-volatiles, relative to 100 parts by weight of the acrylic polymer, a tackifier resin is preferably used in an amount of about 10 to 100 parts by weight (more preferably 20 to 80 parts by mass, or even more preferably 30 to 60 parts by weight).

The PSA composition may comprise a crosslinking agent as necessary. The type of crosslinking agent is not particularly limited and a suitable agent can be selected and used among heretofore known crosslinking agents. Examples of such crosslinking agents include an isocyanate-based crosslinking agent, epoxy-based crosslinking agent, oxazoline-based crosslinking agent, aziridine-based crosslinking agent, melamine-based crosslinking agent, peroxide-based crosslinking agent, metal chelate-based crosslinking agent, etc. For the crosslinking agent, solely one species or a combination of two or more species can be used. In particular, from the standpoint of increasing the cohesive strength, the use of an isocyanate-based crosslinking agent or epoxy-based crosslinking agent is preferable. The amount of crosslinking agent used is not particularly limited. For instance, it can be selected from a range of about 10 parts by weight or less (e.g. about 0.005 to 10 parts by weight, preferably about 0.01 to 5 parts by weight) relative to 100 parts by weight of the acrylic polymer.

The PSA composition may comprise various heretofore known fillers that can be contained in PSAs. As the fillers, various types of particulate substance and fibrous substance can be used. Examples of the material forming the particulate substance include metals such as copper, nickel, aluminum, chromium, iron, stainless steel, etc.; metal oxides such as alumina, zirconia, zinc oxide, etc.; carbides such as silicon carbide, boron carbide, nitrogen carbide, etc.; nitrides such as aluminum nitride, silicon nitride, boron nitride, etc.; inorganic materials such as calcium carbide, calcium carbonate, aluminum hydroxide, glass, silica, etc.; polymers such as a polystyrene, acrylic resin (e.g. polymethyl methacrylate), phenol resin, benzoguanamine resin, urea resin, silicone resin, nylon, polyester, polyurethane, polyethylene, polypropylene, polyamide, polyimide, vinylidene chloride, etc.; and the like. Alternatively, particulate natural raw materials may be used, such as volcanic shirasu, clay, sand and the like. The PSA composition may further comprise, as the fillers, hollow particulate substance (e.g. hollow particles formed from an inorganic material). Examples of such hollow particles include balloons made of glass such as hollow glass balloons, etc.; hollow balloons made of metal-containing compounds such as hollow alumina balloons, etc.; hollow balloons made of ceramics such as hollow ceramic balloons, etc.; and the like. As the fibrous substance, various synthetic fibrous materials and natural fibrous materials can be used. Among these, solely one species or a combination of two or more species can be used. The amount of fillers added is not particularly limited. A suitable amount can be added based on the purpose of addition and technical common knowledge.

The PSA composition may contain as necessary various additives generally used in the field of PSA compositions, such as a leveling agent, crosslinking co-agent, plasticizer, softening agent, colorant (dye, pigment), anti-static agent, anti-aging agent, ultraviolet light absorber, antioxidant, photostabilizing agent, etc. With respect to these various additives, those heretofore known can be used by typical methods. Since these do not specifically characterize the present invention, detailed descriptions are omitted.

The PSA layer disclosed herein can be formed by a heretofore known method. For instance, in a usable method (direct method), where the PSA composition is directly provided (typically applied) to the film-like substrate and allowed to dry to form a PSA layer. In an alternative method (transfer method), the PSA composition is provided to a highly releasable surface (e.g. release face) and allowed to dry to form a PSA layer on the surface, and the PSA layer is transferred to the film-like substrate. As the release face, the surface of a release liner, a release agent-treated back face of a substrate, etc., can be used. The PSA layer disclosed herein is not limited to, but typically formed in a continuous form. For instance, the PSA layer may be formed in a regular or random pattern of dots, stripes, etc.

The PSA composition can be applied, using a heretofore known coater, for instance, a gravure coater, die water, bar coater, etc. Alternatively, the PSA composition can be applied by impregnation, curtain coating method, etc. From the standpoint of facilitating the crosslinking reaction and increasing the productivity, etc., the PSA composition is preferably dried with heating. The drying temperature can be, for instance, about 40° C. to 150° C. (preferably about 60° C. to 130° C.). After dried, the PSA composition may be aged for adjusting the component migration in the PSA layer, pushing the crosslinking reaction forward, reducing deformation that may be present in the substrate or PSA layer, and so on.

The thickness of the PSA layer disclosed herein is not particularly limited and can be suitably selected in accordance with the purpose. Usually, from the standpoint of the productivity such as drying efficiency as well as the adhesive properties, etc., the thickness of the PSA layer is suitably about 3 µm to 200 µm, preferably about 5 µm to 150 µm, more preferably 8 µm to 100 µm, or yet more preferably 15 µm to 80 µm. In a double-faced PSA sheet comprising a PSA layer on each face of a film-like substrate, the thicknesses of the respective PSA layers may be the same or different.

<Release Liner>

As the release liner, any conventional release paper or the like can be used without any particular limitations. For example, can be used a release liner having a release layer on a surface of a substrate such as resin film or paper, etc.; a release liner formed from a poorly-adhesive material such as a fluorine-based polymer (polytetrafluoroethylene, etc.) or a polyolefin-based resin (polyethylene, polypropylene, etc.); or the like. The release layer can be formed, for instance, by subjecting the substrate to a surface treatment with a release agent such as a silicone-based, a long-chain alkyl-based, a fluorine-based, a molybdenum disulfide-based release agent or the like.

Although not particularly limited, when used, the PSA sheet disclosed herein may be adhered to an adherend having a surface formed from, for instance, a metallic material such as stainless steel (SUS), aluminum, etc.; inorganic material such as glass, ceramic, etc.; resin material such as nylon, polycarbonate (PC), polymethyl methacrylate (PMMA), polypropylene, polyethylene terephthalate (PET), etc.; rubber material such as natural rubber, butyl rubber, etc.; a composite material of these, etc.

<Purposes>

The PSA sheet disclosed herein can be efficiently stretch-removed without fracture. With the benefit of this feature, it is preferably used as a PSA sheet for various purposes where it is removed after adhered. For instance, the PSA sheet disclosed herein can be applied for purposes such as fastening protection panels (lenses) to protect displays for use in electronics, fixing decoration panels in televisions, fastening battery packs in PCs, water-proofing of lenses of digital video cameras, etc. In particular, it can be preferably used as a PSA sheet for use in mobile electronics which require its smooth removal for parts repair, replacement, inspection, recycling, etc. For instance, in mobile electronics such as mobile phones, smartphones, tablet PCs, notebook PCs, etc., it can be preferably applied for purposes such as fastening protection panels (lenses) to protect displays, fastening key modules, fastening rim sheets, fastening decoration panels, fastening batteries, etc. The term "mobile" in this description means not just providing simple mobility, but further providing a level of portability that allows an individual (average adult) to carry it relatively easily.

The PSA sheet disclosed herein (typically a double-faced PSA sheet) provides a great ability (pull-out removability) that allows its pull-out removal from between adherends. Herein, the pull-out removability refers to the ease of removal carried out in such a way that from two adherends fastened via the PSA sheet with a segment (typically a tab) thereof being exposed, the PSA sheet is drawn out by pulling the exposed segment to release the attachment (typically a joint) between the adherends. The two adherends may be two different locations in a single component. More specific descriptions are provided below with reference to FIGS. 4(a)-4(c) and 5(a)-5(c).

Figure 4A:
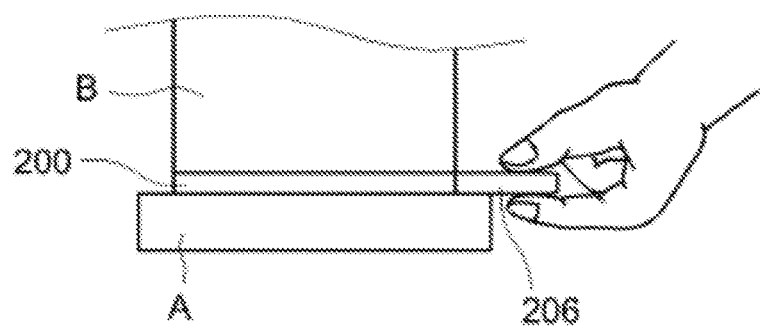
FIGS. 4(a), 4(b), and 4(c) show schematic side views illustrating an embodiment of stretch removal.
Figure 4B:
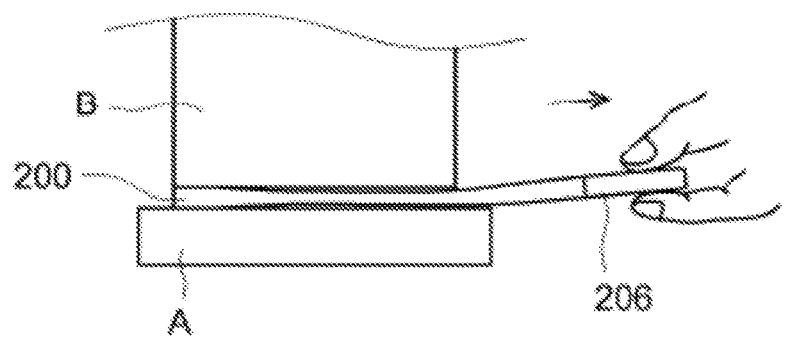
Figure 4C:
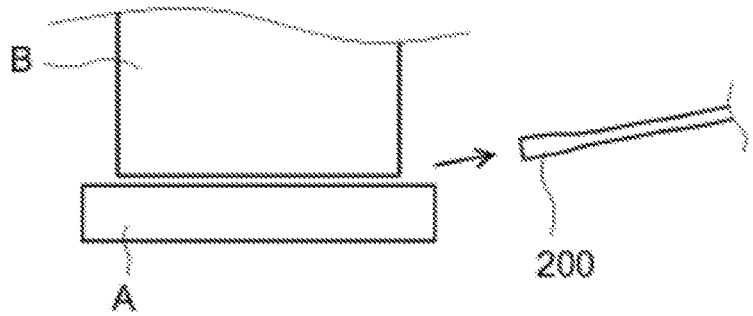
Figure 5A:
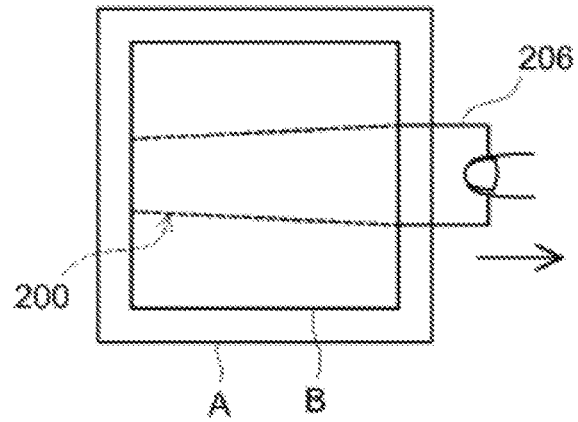
FIGS. 5(a), 5(b), and 5(c) show schematic top views illustrating an embodiment of stretch removal.
Figure 5B:
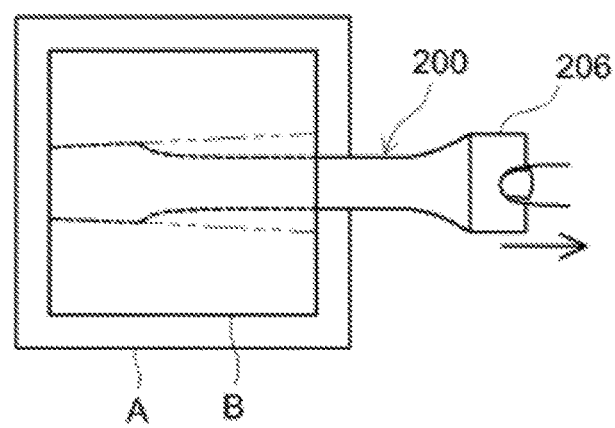
Figure 5C:
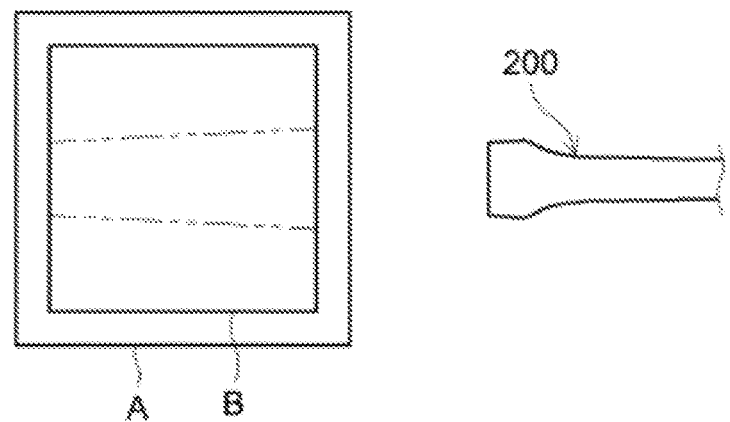

FIGS. 4(a)-4(c) show schematic side views to illustrate an embodiment of stretch removal (typically pull-out removal), with FIG. 4(a) showing the state of the PSA sheet at the start of stretch removal, FIG. 4(b) showing the state of the PSA sheet being pulled for removal and FIG. 4(c) showing the state of the PSA sheet at the completion of stretch removal. FIGS. 5(a)-5(c) show schematic top views to illustrate an embodiment of stretch removal (typically pull-out removal), with FIGS. 5(a)-5(c) corresponding to FIGS. 4(a)-4(c) respectively.

As shown in FIG. 4(a) and FIG. 5(a), a PSA sheet (double-faced PSA sheet) 200 is provided with a tab 206 which is exposed to the outside when joining adherends A and B. The PSA sheet 200 is used to join adherend A and adherend B. After the purpose of joining is fulfilled, tab 206 is pinched with fingers and PSA sheet 200 is pulled so as to draw it out from between adherends A and B. PSA sheet 200 then begins to extend while contracting in the direction perpendicular to the puffing direction and starts to peel off adherends A and B (see FIG. 4(b), FIG. 5(b)). Here, since PSA sheet 200 has a tapering shape, with the progress of separation of PSA sheet 200, the tensile load gradually decreases while the adhesive strength decreases where the separation is about to occur. This can bring about efficient progress of stretch removal. Eventually, the entire adhesion area of PSA sheet 200 peels off, whereby PSA sheet 200 is completely pulled out from between adherends A and B (see FIG. 4(c), FIG. 5(c)). The detachment of adherend B that had been joined to adherend A is also completed at the same time. In the stretch removal, since the substrate of PSA sheet 200 has a minimum cross-sectional area set to or above a certain value, the puffing will not cause failure such as fracture, etc.

A PSA sheet with excellent stretch removability as described above is preferable as a PSA sheet used for fastening batteries (e.g. polymer batteries) in mobile electronics. Batteries are often placed in locations where their removal is usually required for repair, replacement, inspection, etc., of components (including batteries) in mobile electronics. Accordingly, removal is frequently required with the battery-fastening PSA sheets. When used for this purpose, the PSA sheet provides a function to properly fasten a battery. At the same time, when detaching the battery at the end-of-life, by means of stretch removal (typically pull-out removal), it can be easily detached. The PSA sheet is particularly preferably used as a PSA sheet for fastening a polymer battery. Polymer batteries tend to easily deform as compared with other types of batteries (typically batteries having metal cases). Thus, by a conventional peel-off method, the batteries would deform, sometimes resulting in functional failure. According to the PSA sheet disclosed herein, by means of the stretch removal (typically pull-out removal), while reducing deformation of polymer batteries, the PSA sheet can be removed properly.

PSA sheets used for fastening batteries in mobile electronics cannot be often pulled in parallel with the shear direction during removal because of other components present around the batteries or because of where the batteries are, etc. In such a case, the PSA sheet is removed by pulling at an angle not in parallel with the adhesion face(s) (e.g. at an angle of 45° or larger, but 90° or smaller, typically at an angle of 70° or larger, but smaller than 90°). Because of these circumstances, during removal, the battery-fastening PSA sheet has been susceptible to damage upon contact with the adherend (battery) or an object in the way, leading to the likely occurrence of fracture. According to the art disclosed herein, even in such an embodiment of stretch removal, excellent stretch removability can be realized with little damage.

The PSA sheet with excellent stretch removability (typically pull-out removability) is also preferable as a PSA sheet (typically a double-faced PSA sheet) used for fastening an adherend (article to be fixed, article to be adhered, etc.) that is adhered to a wall surface or pillar, furniture, home appliance, glass surface, etc., and replaced after used for a prescribed period of time. Also in this application, the PSA sheet provides a great fastening function while the adherend is fixed, yet when the adherend is detached, by holding a tab or the like provided to the PSA sheet and pulling out the entire PSA sheet, the PSA sheet can be efficiently removed (e.g. in the arrow direction in FIG. 4($c$)).

EXAMPLES

Several worked examples relating to the present invention are described below, but the present invention is not intended to be limited to these examples. In the description below, "parts" and "%" are based on weight unless otherwise specified.

Example 1

Preparation of Acrylic PSA Composition

To a reaction vessel equipped with a stirrer, thermometer, nitrogen gas inlet, reflux condenser and addition funnel, were placed 100 parts of BA, 5 parts of VAc, 3 parts of AA and 0.1 part of HEA, 0.2 part of AIBN as a polymerization initiator and toluene as a polymerization solvent. Solution polymerization was carried out at 60° C. for 6 hours to obtain a toluene solution of an acrylic polymer. The Mw of the acrylic polymer was $55 \times 10^4$.

To 100 parts of the acrylic polymer in the toluene solution, was added 30 parts of a polymerized rosin ester resin (product name "PENSEL D-125" available from Arakawa Chemical Industries, Ltd., softening point 125° C.) and was further added 2 parts of an isocyanate-based crosslinking agent (product name "CORONATE L" available from Nippon Polyurethane Industry Co., Ltd.) to prepare an acrylic PSA composition.
(Preparation of Double-Faced PSA Sheet)

Were obtained two sheets of a commercial release liner (trade name "SLB-80W3D" available from Sumikakakoushi Co., Ltd.). To the respective first faces (release faces) of the release liners, the PSA composition was applied to a dry thicknesses of 25 μm and allowed to dry at 100° C. for two minutes. The respective PSA layers (first PSA layer and second PSA layer) were thus formed on the release faces of two release liners.

As a film-like substrate, a 100 μm thick unexpanded ether-based polyurethane resin film was obtained. To the two faces of the film-like substrate, were adhered the respective PSA layers formed on the two sheets of release liner. The release liners were left as they were on the PSA layers to protect the surfaces (adhesive faces) of the PSA layers. The resulting structure was passed through a laminator at 80° C. (0.3 MPa, 0.5 m/min rate) once and then aged in an oven at 50° C. for one day. The shape schematically shown in FIG. 2 was punched out of the resulting PSA sheet to fabricate a double-faced PSA sheet according to the present example. As shown in FIG. 2, this PSA sheet had a long section formed of a trapezoidal tapered segment 5 and a tab 6 with the tapered segment having a tip 1$a$ of 6.0 mm in width (minimum width) W1, a maximum width W2 of 12.5 mm and a distance (shortest distance) L of 80 mm from the tip 1$a$ to the location of the maximum width W2.

Examples 2-5

The tip widths W1 of tapered segments were made 3.0 mm and 2.0 mm, but otherwise in the same manner as Example 1, PSA sheets according to Examples 2 and 3 were fabricated, respectively. The tapered segment was made triangular instead of trapezoidal, but otherwise in the same manner as Example 1, a PSA sheet according to Example 4 was fabricated. In other words, the tip width (W1) of the PSA sheet according Example 4 was 0 mm. In addition, in the same manner as Example 1, but without the tapering, a PSA sheet according to Example 5 was fabricated. The PSA sheet according to Example 5 had a short ribbon shape with an edge measuring 12.5 mm in width W1.
[Stretch Removability Test]

Figure 6:
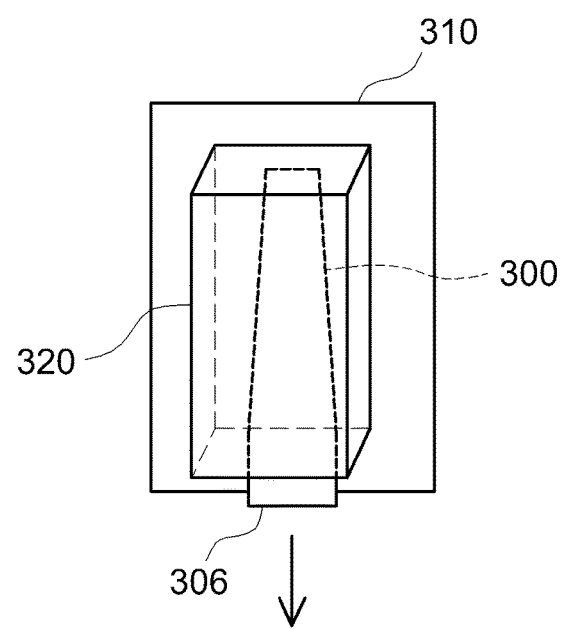
FIG. 6 shows an explanatory drawing schematically illustrating the stretch removability test.

As shown in FIG. 6, to a stainless steel plate 310, a PSA sheet 300 according to each example was adhered over the first adhesive face. Subsequently, to the second adhesive face, a polycarbonate block 320 was adhered and press-bonded by pushing the resultant at 50 N for 10 seconds. They were adhered in such a way that the entire tapered segment of PSA sheet 300 was adhered to stainless steel 310 and polycarbonate block 320 while a tab 306 is exposed to the outside. After left standing for 30 minutes, tab 306 of PSA sheet 300 was held with fingers and pulled in the direction opposite the tip of the tapered segment and at a peel angle of 0° relative to the adhesive faces (in the shear direction or the arrow direction in FIG. 6) to evaluate the stretch removability. Three test rounds were performed with each example. The results are shown in Table 1.

TABLE 1

|  | Ex. 1 | Ex. 2 | Ex. 3 | Ex. 4 | Ex. 5 |
| --- | --- | --- | --- | --- | --- |
| Shape of tapered segment | Trapezoidal | Trapezoidal | Trapezoidal | Triangular | — |
| End width W1 (mm) | 6.0 | 3.0 | 2.0 | — | 12.5 |
| Maximum width W2 (mm) | 12.5 | 12.5 | 12.5 | 12.5 | 12.5 |
| Distance L (mm) | 80 | 80 | 80 | 80 | 80 |
| Minimum cross-sectional area of substrate (mm$^2$) | 0.60 | 0.30 | 0.20 | — | 1.25 |

TABLE 1-continued

| | Ex. 1 | Ex. 2 | Ex. 3 | Ex. 4 | Ex. 5 |
|---|---|---|---|---|---|
| Stretch removability | Load decreased with pulling, Easy removal | Load decreased with pulling, Easy removal, but fracture in some samples during second half of pulling | Near-end fracture during second half of pulling | Near-end fracture during second half of pulling | Constantly required large tensile load |

As shown in Table 1, since the PSA sheet according to Example 1 had a tapering shape and a minimum cross-sectional area of film-like substrate larger than 0.30 mm², it provided excellent stretch removability and suffered no fracture. Specifically, the tensile load decreased along with the progress of pulling to facilitate the removal, achieving efficient removal from the adherend. On the other hand, with respect to the PSA sheets according to Examples 2 to 4 whose substrates had minimum cross-sectional areas of 0.30 mm² or smaller, the PSA sheets suffered fracture during the second half of the pulling. The non-tapered PSA sheet according to Example 5 provided poor workability for pulling, not providing efficient removal of the PSA sheet. From these results, it can be found that the presence of a tapering shape and at least a certain minimum cross-sectional area of the film-like substrate are required to allow efficient stretch removal of a PSA sheet from adherend along with prevention or reduction of damage such as fracture, etc., caused by pulling.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1 PSA sheet
1a first end (tip) of length direction
5 tapered segment
6 tab
10 film-like substrate
21, 22 PSA layers
W1 width (minimum width) at first end
W2 maximum width of tapered segment
L distance from first end to maximum width location

What is claimed is:

1. A stretchable pressure-sensitive adhesive sheet comprising:
a pressure-sensitive adhesive layer; and
a film substrate supporting the pressure-sensitive adhesive layer,
wherein
the pressure-sensitive adhesive sheet has a long section,
the long section has a tapered segment that extends, tapering to a first end of the length direction, and
the tapered segment has a minimum cross-sectional area larger than 0.30 mm²,
the tapered segment has a width W1 (mm) at the first end, a maximum width W2 (mm), and a length L (mm) from the first end of the length direction of the long section to where the maximum width W2 is located, satisfying an equation $(W2-W1)/L < 9.5/80$.

2. The stretchable pressure-sensitive adhesive sheet according to claim 1, wherein the stretchable pressure-sensitive adhesive sheet is capable of being removed in such a way it is pulled in the direction opposite the first end of the length direction from an adherend on which the stretchable pressure-sensitive adhesive sheet is adhered.

3. The stretchable pressure-sensitive adhesive sheet according to claim 2, further comprising, as the pressure-sensitive adhesive layer, a first pressure-sensitive adhesive layer placed above a first face of the film substrate and a second pressure-sensitive adhesive layer placed above a second face of the film substrate.

4. The stretchable pressure-sensitive adhesive sheet according to claim 3, wherein the stretchable pressure-sensitive adhesive sheet is capable of being removed in such a way that it is pulled out from between two adherends that bond together in a state of sandwiching the stretchable pressure-sensitive adhesive sheet.

5. The stretchable pressure-sensitive adhesive sheet according to claim 2, wherein the film substrate is an unexpanded resin film substrate.

6. The stretchable pressure-sensitive adhesive sheet according to claim 1, further comprising a tab at an end opposite the first end of the length direction of the long section.

7. The stretchable pressure-sensitive adhesive sheet according to claim 1, further comprising, as the pressure-sensitive adhesive layer, a first pressure-sensitive adhesive layer placed above a first face of the film substrate and a second pressure-sensitive adhesive layer placed above a second face of the film substrate.

8. The stretchable pressure-sensitive adhesive sheet according to claim 7, wherein the stretchable pressure-sensitive adhesive sheet is capable of being removed in such a way that it is pulled out from between two adherends that bond together in a state of sandwiching the stretchable pressure-sensitive adhesive sheet.

9. The stretchable pressure-sensitive adhesive sheet according to claim 1, wherein the film substrate is an unexpanded resin film substrate.

10. The stretchable pressure-sensitive adhesive sheet according to claim 1 capable of fastening a battery.

* * * * *